United States Patent
Vail, Jr. et al.

(10) Patent No.: US 11,143,162 B2
(45) Date of Patent: Oct. 12, 2021

(54) TURBINE SYSTEM WITH LIFT-PRODUCING BLADES

(71) Applicant: Bernoulli LLC, Cleveland Heights, OH (US)

(72) Inventors: Tom Vail, Jr., Cleveland Heights, OH (US); Lonnie P. Lenarduzzi, Twinsburg, OH (US)

(73) Assignee: Bernoulli LLC, Cleveland Heights, OH (US)

( * ) Notice: Subject to any disclaimer, the term of this patent is extended or adjusted under 35 U.S.C. 154(b) by 0 days.

(21) Appl. No.: 16/370,054

(22) Filed: Mar. 29, 2019

(65) Prior Publication Data

US 2020/0191115 A1 Jun. 18, 2020

Related U.S. Application Data

(60) Provisional application No. 62/781,382, filed on Dec. 18, 2018.

(51) Int. Cl.
*F03D 3/04* (2006.01)
*F03D 3/00* (2006.01)
(Continued)

(52) U.S. Cl.
CPC .............. *F03D 3/04* (2013.01); *F03D 3/002* (2013.01); *F03D 3/005* (2013.01); *F03D 3/02* (2013.01);
(Continued)

(58) Field of Classification Search
CPC ........ F03D 3/002; F03D 3/004; F03D 3/0427; F03D 3/0436; F03D 3/0463; F03D 3/065
See application file for complete search history.

(56) References Cited

U.S. PATENT DOCUMENTS

| 698,409 A | 4/1902 | Windmill |
| 3,876,925 A | 4/1975 | Stoeckert |

(Continued)

FOREIGN PATENT DOCUMENTS

| EP | 2825769 B1 | 8/2016 |
| WO | 2013136060 A1 | 9/2013 |

OTHER PUBLICATIONS

International Search Report and Written Opinion for corresponding International Application PCT/US2019/065950 dated Apr. 1, 2020.

*Primary Examiner* — J. Todd Newton, Esq.
*Assistant Examiner* — Cameron A Corday
(74) *Attorney, Agent, or Firm* — Renner, Otto, Boisselle & Sklar, LLP

(57) ABSTRACT

A fluid and wind turbine system suitable for horizontal or vertical axis applications comprising (i) blades radially spaced around a rotational axis attached to a shaft by mounting formations so that the length axis of the mounting formations are substantially parallel to the width axis of the blades which mounting formations suspend the blades from the rotational axis creating a passageway allowing the air flow to pass through the turbine and impart a unidirectional rotational force to the shaft at all times the blades are exposed to the air flow on both the windward and leeward sides of the rotational axis (ii) an air flow director which shields the rotating blades from the air flow for a portion of their 360-degree rotation.

25 Claims, 15 Drawing Sheets

(51) Int. Cl.
*F03D 3/06* (2006.01)
*F03D 13/20* (2016.01)
*F03D 13/25* (2016.01)
*F03D 9/45* (2016.01)
*F03D 9/25* (2016.01)
*F03D 3/02* (2006.01)

(52) U.S. Cl.
CPC .............. *F03D 3/061* (2013.01); *F03D 9/25* (2016.05); *F03D 9/45* (2016.05); *F03D 13/20* (2016.05); *F03D 13/25* (2016.05); *F05B 2240/12* (2013.01); *F05B 2240/301* (2013.01); *F05B 2240/95* (2013.01); *F05B 2250/711* (2013.01)

(56) References Cited

U.S. PATENT DOCUMENTS

| | | | |
|---|---|---|---|
| 4,115,028 A | 9/1978 | Hintze | |
| 4,204,795 A | 5/1980 | Forrest | |
| 5,472,311 A * | 12/1995 | Davis | F03D 3/0454 415/4.1 |
| 5,852,331 A | 12/1998 | Giorgini | |
| 6,942,454 B2 | 9/2005 | Ohlmann | |
| 7,315,093 B2 | 1/2008 | Graham, Sr. | |
| 7,744,338 B2 | 6/2010 | DeRuyter et al. | |
| 8,840,360 B2 * | 9/2014 | Quintal | F03D 3/002 415/4.1 |
| 2002/0015639 A1 | 2/2002 | Roberts | |
| 2005/0201855 A1 * | 9/2005 | Fan | F03D 7/06 415/4.1 |
| 2006/0110243 A1 * | 5/2006 | Taylor | F03D 3/0427 415/53.1 |
| 2009/0081020 A1 | 3/2009 | Caldwell | |
| 2010/0032954 A1 * | 2/2010 | Law | F03D 9/25 290/55 |
| 2010/0213716 A1 * | 8/2010 | Santoro | F03D 3/002 290/54 |
| 2010/0215488 A1 | 8/2010 | Santoro | |
| 2012/0256423 A1 * | 10/2012 | Liu | F03D 1/02 290/55 |
| 2013/0017084 A1 | 1/2013 | Claude | |
| 2013/0195636 A1 | 8/2013 | Poole | |

* cited by examiner

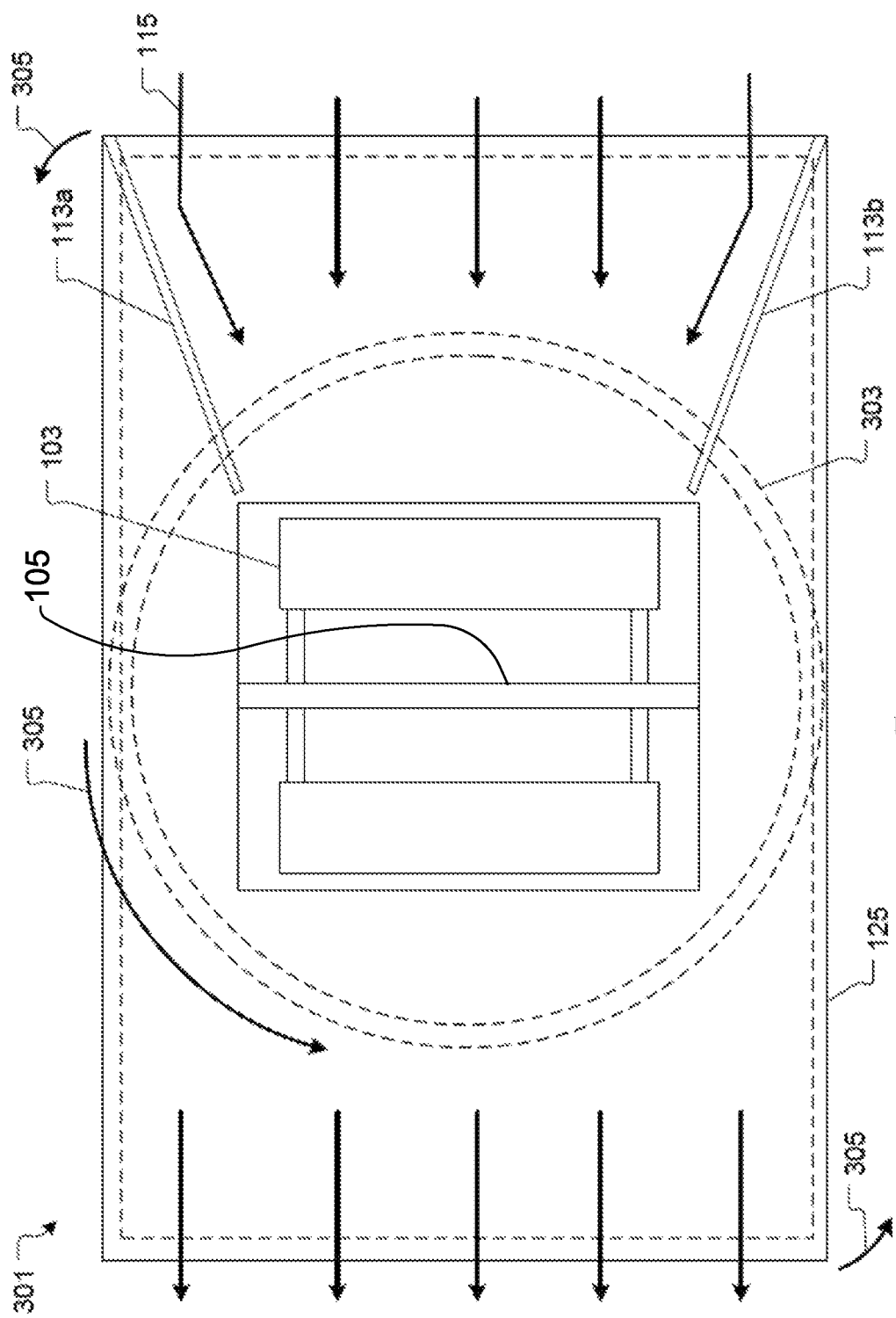

TURBINE SYSTEM WITH LIFT-PRODUCING BLADES

REFERENCE TO RELATED APPLICATION

This application claims priority to U.S. Provisional Application 62/781,382, filed Dec. 18, 2018, which is incorporated by reference in its entirety.

BACKGROUND

Field of the Invention

The present invention relates generally to fluid turbine systems, and more specifically, to wind turbine systems for converting the kinetic energy of an air flow to electrical energy or mechanical energy by passing over blades to rotate a shaft.

Description of Related Art

Fluid turbine systems are well known in the art and are effective in extracting energy from an air flow or fluid flow (hereinafter collectively referred to as "air flow," it being recognized that fluid turbine systems may function when exposed to a fluid flow such as a water flow or a gas flow or an air flow). Large wind turbines common in the art involve shafts with a horizontal axis of rotation where the shaft is generally directed and oriented to be parallel to the air flow (hereinafter referred to as a horizontal axis wind turbine or "HAWT"). Blades extend radially outward from the axis of rotation and thus are oriented generally perpendicular to the direction of the air flow in the HAWT. The blades are not symmetrical from leading edge to trailing edge in cross section, are frequently of varying width along a length thereof, are constructed with twist along a length thereof to vary an angle of attack to the air flow, are arrayed radially about the shaft with the length of the blades being perpendicular to the shaft, and capture the air flow causing the shaft to rotate. A tower or stand is used to elevate the HAWT in the air flow.

These known HAWT turbine designs are widely commercially used but have disadvantages that include a very large frontal surface area (i.e., the large frontal surface is viewed along the direction of the rotational axis and the blades extend radially outward therefrom over a large radius/diameter) resulting in an unattractive and unpopular appearance, propensity for the blades to strike birds due to the outer sections of the blades traveling at very high speeds, high noise levels, high maintenance costs due to the elevated position of the generator and stability issues resulting from a short shaft length and other shortcomings requiring the turbines to shut down at high air flow speeds. Many proposed applications of typical three-bladed HAWTs are legally forbidden due to the extreme height and frontal area of the turbines which makes them unattractive, unpopular and subject to large and frequently unavailable property line setbacks required to make the HAWTs invisible from adjacent properties and other certain vantage points.

Turbines with shafts on a vertical axis of rotation positioned perpendicular to the air flow (generally referred to herein as a vertical axis wind turbine or "VAWT" are common in the art but are less frequently used commercially. Generally, VAWTs are less efficient than horizontal axis turbines because VAWTs expose the blades to the air flow for the entire 360-degree rotation of the blades resulting in the rotor blades moving against the wind for a portion of the full 360-degree rotation of the blades resulting in drag that imparts a force opposite to the desired direction of rotation. The vast majority of VAWTs follow either the Savonius or the Darrieus design models. Both models could benefit from improvement.

Continuing the above discussion, the Savonius style models use blades having a semicircular or half spherical cross section which do not derive lift resulting from lower pressure on the convex side of the blade than the non-convex side of the blade when fluid passes on both sides of the blades to produce lift as described by the Bernoulli principle (this Bernoulli principle lift force is referred to herein as "lift"); rather these Savonius style VWATs simply cup the wind with a concave inner surface portion of the turbine blade causing the shaft to rotate and present a lower drag, convex surface portion of the turbine blade to the air flow when the blades are moving against the air flow. Generally, the blades of Savonius style VAWTs are not suspended a clear distance from the rotational axis and little or no rotational force is transmitted by blades moving on the downstream or leeward (hereinafter collectively referred to as "leeward", it being recognized that the present invention functions when exposed to a fluid flow such as a water flow as well as a gas flow or an air flow) side of the rotational axis. The Savonius style VAWTs do not shield the blades from the air flow when they are moving in a direction opposed to the air flow but rather simply present the lower drag convex side of the blade to the air flow when the blades are moving in a direction opposing the prevailing air flow. In the Darrieus style of VAWT the blades are generally asymmetrical in cross section and are mounted in a cylindrical rather than radial array around the vertical axis of rotation positioned such that a width (chord) axis of the blades "W" (which width axis is defined as a line running perpendicular to the leading edge of the blade facing the air flow and extending to trailing edge of the blade not facing the air flow) positioned perpendicular to a length axis of mounting arms or mounting formations (collectively referred to hereinafter as "mounting formations") which length axis of the mounting formations is aligned perpendicular to the shaft and extends from the point the mounting formations are attached to the shaft to the point the mounting formations are attached to the blades. In addition, VAWTs commonly firmly support the shaft only at the bottom, resulting in uneven bearing loads and stability problems for large scale applications and high air flow velocities. Finally, conventional VAWTs are not designed to be aligned with respect to the direction of the air flow which prohibits them from being feathered at an angle to the air flow in order to usefully control shaft rotation speeds or stop the shaft from rotating in high air flow velocities.

Accordingly, although great strides have been made in the area of wind turbine systems, the general public considers these turbines to be an eyesore and this objection has prevented many wind farms from being constructed.

SUMMARY OF THE INVENTION

According to an aspect of the invention, a turbine system includes: a shaft configured to rotate about an axis; a plurality of blades coupled to the shaft, wherein the blades are oriented with the width (chord) axis of the blades aligned in a radial direction away from the axis, and wherein the blades are configured to provide lift according to the Bernoulli principle resulting from lower pressure on the convex side of the blades than the non-convex side of the blades when fluid passes on both sides of the blades, in the direction of rotation through portions of the rotation of the blades about the axis on both the windward and leeward sides of the rotational axis; mounting formations which attach the blades to the shaft and suspend the blades away from the shaft, with air flow passages defined between the shaft and the blades; and an air flow director configured to expose the blades to air flow through a first part of rotation of the blades about the axis, and to block air flow to the blades through a second part of the rotation of the blades about the axis; wherein the air flow director is configured and oriented to direct the air flow in part through the air flow passages defined between the shaft and the blades.

According to an embodiment of any paragraph(s) of this summary, the air flow director is positioned on a windward side of the blades.

According to an embodiment of any paragraph(s) of this summary, the air flow director has channeling flow diverters mounted on an external surface of the air flow director, for diverting air flow toward the blades.

According to an embodiment of any paragraph(s) of this summary, the air flow director has a portion located on the windward side of the blades and also a portion located on the leeward side of the blades.

According to an embodiment of any paragraph(s) of this summary, the air flow director further has exhaust passages in the portion of the air flow director which is located leeward of the blades.

According to an embodiment of any paragraph(s) of this summary, the air flow director defines side passages that allow air flow to exhaust from the area encompassed by the surface of the air flow director which is not exposed to the prevailing air flow.

According to an embodiment of any paragraph(s) of this summary, each of the blades has positive camber when viewed in cross section, with a mean camber line closer than a chord line to a convex external surface of the blade.

According to an embodiment of any paragraph(s) of this summary, the blades each have a leading edge, proximal to the rotational axis, and a trailing edge, distal to the rotational axis; and wherein for each of the blades a chord line of the blade from the leading edge to the trailing edge intersects with the rotational axis.

According to an embodiment of any paragraph(s) of this summary, the blades each are configured to provide positive Bernoulli principle lift on a windward side of the shaft, tending to pull the blades into the air flow, and negative Bernoulli principle lift on a leeward side of the shaft, tending to push the blades out of the air flow.

According to an embodiment of any paragraph(s) of this summary, a turbine system further includes blades which can pivot in only one direction around the mounting formations to which they are attached.

According to an embodiment of any paragraph(s) of this summary, a turbine system further includes a generator that converts rotational energy to electrical or mechanical energy, wherein the generator is operatively connected with the shaft.

According to an embodiment of any paragraph(s) of this summary, wherein the air flow director is configured to be open in the front facing the air flow and the back but closed in on the top and sides by surfaces which have a convex side facing the interior of the turbine to accelerate and/or direct the air flow through the turbine.

According to an embodiment of any paragraph(s) of this summary, a turbine system further includes a platform configured for rotation on an axis such that the blades exposed to the air flow are aligned with the direction of the air flow.

According to an embodiment of any paragraph(s) of this summary, the platform is buoyant.

According to an embodiment of any paragraph(s) of this summary, the platform is connected by a tether to a fixed mount allowing the platform to float downwind of the air flow.

According to an embodiment of any paragraph(s) of this summary, the turbine system is in combination with tethers used to mount the turbine system to a supporting structure.

According to an embodiment of any paragraph(s) of this summary, two counterrotating blade/mounting formation/shaft assemblies share a single common air flow director.

According to an embodiment of any paragraph(s) of this summary, the turbine is mounted on the top and/or side of a building.

According to an embodiment of any paragraph(s) of this summary, the turbine system is in combination with an additional turbine system wherein the two turbine systems have counterrotating blades and share a single common air flow director.

According to an embodiment of any paragraph(s) of this summary, the turbine is positioned with a vertical axis of rotation and is mounted on a turntable or is otherwise enabled to rotate on a pedestal.

According to an embodiment of any paragraph(s) of this summary, the blades each have a first external surface that is convex, and a second external surface that is not convex.

According to an embodiment of any paragraph(s) of this summary, the second external surface of the blades is flat.

According to an embodiment of any paragraph(s) of this summary, the blades each have a leading edge, proximal to the rotational axis, and a trailing edge, distal to the rotational axis.

According to an embodiment of any paragraph(s) of this summary, the blades are each thinner at the leading edge and the trailing edge than they are between the leading edge and the trailing edge.

According to an embodiment of any paragraph(s) of this summary, the blades are each thickest at a midpoint between the leading edge and the trailing edge.

According to an embodiment of any paragraph(s) of this summary, the blades each have a symmetric thickness in a width direction, about the midpoint.

According to an embodiment of any paragraph(s) of this summary, the blades each have a uniform thickness along the width of the blade.

According to an embodiment of any paragraph(s) of this summary, the external surface of each blade closest to the chord is concave.

According to another aspect of the invention, a turbine system includes: a shaft configured to rotate about an axis; a plurality of blades coupled to the shaft, wherein the blades are oriented with width axis of the blades aligned in a radial direction away from the axis; and an air flow director configured to expose the blades to air flow through a first part of rotation of the blades about the axis, and to block air flow to the blades through a second part of the rotation of the blades about the axis; wherein the air flow director has a portion located windward of the rotational axis and a portion located leeward of the rotational axis; and wherein the windward air flow director portion has a convex shape.

Novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

BRIEF DESCRIPTION OF THE DRAWINGS

FIG. 3 is a top overhead view of the system of FIG. 1.

DETAILED DESCRIPTION OF THE PREFERRED EMBODIMENTS

Figure 1:
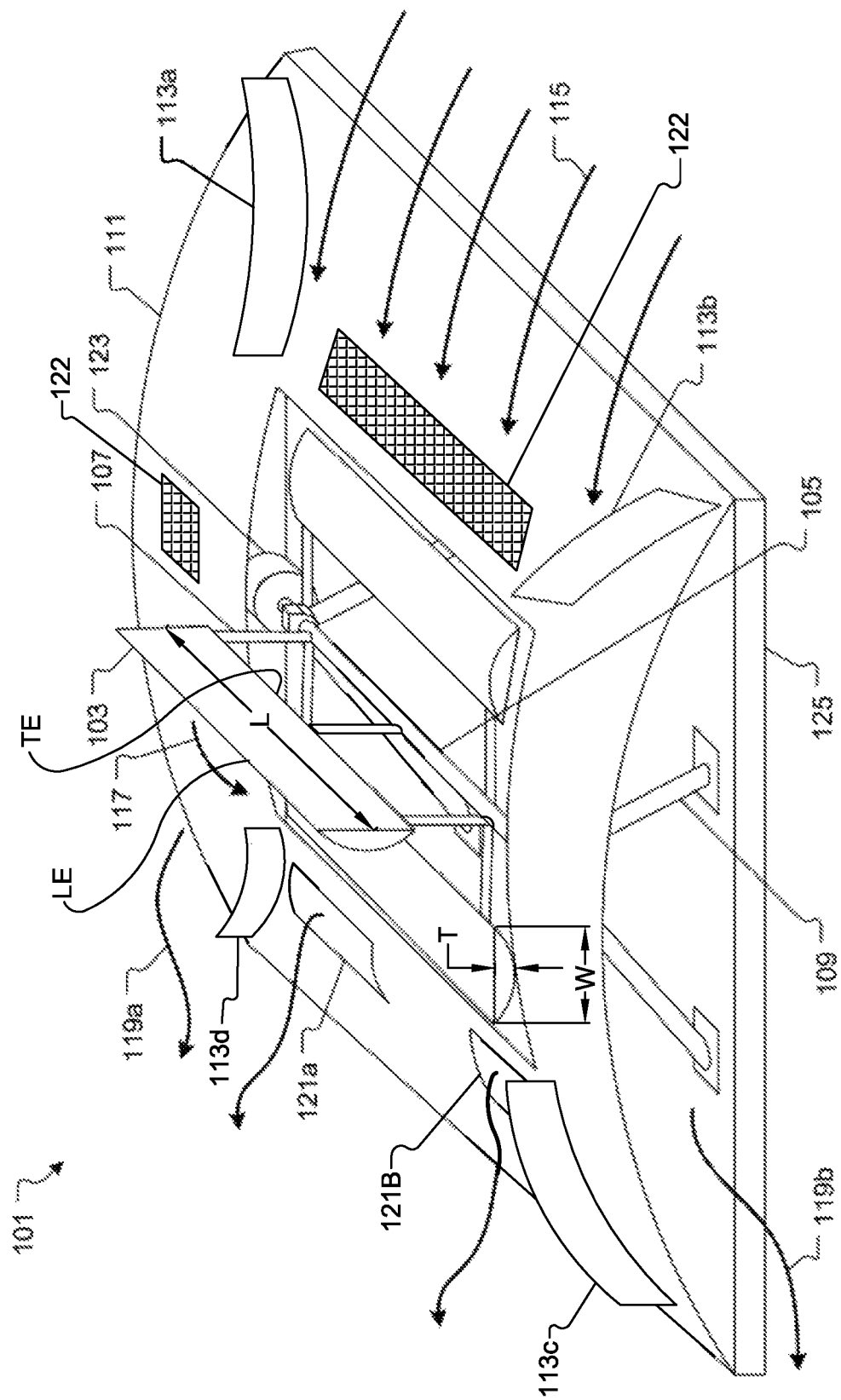
FIG. 1 is a perspective view of an exemplary embodiment of a HAWT system having multiple blades.

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with conventional wind turbine systems. Unlike the prior art, the invention of the present application enables efficient capture of a wind flow in both horizontal (HAWT) and vertical (VAWT) configurations. In both HAWT and VAWT applications, the blades have positive camber when viewed in cross section, with a mean camber line closer than a chord line to a convex external surface of the blade. The position and alignment of the blades allows the blades exposed to the air flow to impart a desired unidirectional rotation to the shaft at all times that the blades are exposed to the air flow. This desired action (imparted unidirectional rotation) of the shaft results when fluid passes over both the convex and non-convex sides of the blades moving on the upstream or windward (hereinafter collectively referred to as "windward," it being recognized that the present invention functions when exposed to a fluid flow such as a water flow as well as a gas flow or an air flow) side of the rotational axis causing positive lift, unlike the prior art relating to VAWT which used a simple cupped blade design like the Savonius style cup blade models of the prior art. Unlike the prior art, this desired action (desired unidirectional rotation) of the shaft also results when the blades of the present invention are inverted when the air flow passes over both the convex and non-convex sides of the blades as they move on the downstream or leeward (hereinafter referred to as "leeward" it being recognized that the present invention functions when exposed to a fluid flow such as a water flow as well as a gas flow or an air flow) side of the rotational axis and are subjected to negative lift. In addition, as the blades exposed to the air flow transition from the windward to the leeward side of the rotational axis, the wing created by their cross-sectional shape increases its angle of attack with respect to the air flow until the wing aerodynamically stalls and no longer produces lift. However, the air flow continues to impart the desired unidirectional rotation to the shaft with a pushing spinnaker like force on the non-convex side of the blades until that point in the rotation of the blades when the blades encounter negative lift on the leeward side of the rotational axis. Therefore, the movement of the blades in response to the airflow acting on the blades imparts a unidirectional rotational force to the shaft the entire time that the blades are exposed to the air flow, unlike the prior art of VAWTs.

The interaction of the prevailing air flow acting on the blades occurs along that portion of the rotational path of the blades where the blades are exposed to the air flow. Unlike prior art relating to VAWTs, in the illustrated embodiment, this interaction between the wind and the individual blades extends over approximately 180 degrees of the full 360-degree rotation of the blades about the shaft. The mounting formations are mounted radially outward from the rotatable shaft. There are generally at least two locations for mounting formations, one at each end of the shaft, although additional mounting formations may be placed intermediately along the shaft to help stiffen the rotating structure. The blades are mounted to the mounting formations in a circumferentially spaced array with the leading edges of the blades defining the circumference of the rotor with the width (chord) axis of the blade "W" (where the width (chord) axis "W" is shown and defined as extending in a line perpendicular to the leading edge of the blade running from the leading edge facing the air flow to the trailing edge of the blade not facing the air flow) parallel to a longitudinal axis of the mounting formations (measured in a line perpendicular to the shaft extending from the point where the mounting formation attaches to the shaft to the point where the mounting formation attaches to the blade). Generally, in the prior art relating to Darrieus style VAWTs, the width (chord) axis "W" of the blades is mounted perpendicular to the length axis of the mounting formations.

Embodiments described in the present application preferably increases the efficiency of the blades exposed to an air flow by mounting the blades suspended and spaced away from the shaft so that substantial openings are formed between the shaft and the individual blades. This blade mounting arrangement allows the prevailing air flow to impart positive Lift to blades when the blades are on the windward side of the rotational axis and also allows the air flow to pass through the turbine unimpeded to impart negative Lift to the blades when the blades are on the leeward side of the rotational axis. Specifically, when used in an HAWT application, the blades are preferably mounted so that the convex external surface of each blade is located above the chord of such blade along that portion of rotation of the blade while the width (chord) axis ("W") of the blade exposed to the air flow moves from horizontal to vertical as the blade exposed to the air flow moves on the windward side of the rotational axis, and conversely, the chord of each blade is located above the convex external surface of such blade along that portion of rotation of the blade while the width (chord) axis ("W") of the blade exposed to the air flow moves from vertical to horizontal and the leading and trailing edges of each blade are reversed with respect to their orientation to the air flow as the blades travel on the leeward side of the rotational axis. In addition, this mounting arrangement allows the air flow interaction with the blades to impart a pushing spinnaker like force to the blades as the blades exposed to the air flow transition from the windward to the leeward side of the rotational axis. In all cases, the prevailing air flow interacting with the blades imparts a unidirectional rotational force to the shaft, unlike the prior art relating to VAWTs where the blades impart a rotational force counter to the desired rotational force during part of their 360-degree rotation.

In each embodiment, a housing or fluid flow/air flow director (hereinafter referred to as the "air flow director," it being recognized that the present invention functions when subjected to a fluid flow such as a water flow as well as a gas flow or an air flow) reduces or eliminates the negative rotational effect of rotor blades when the blades are moving in the opposite direction of the air flow during a portion of the rotation of the blades around the shaft by shielding the blades from the prevailing air flow. The air flow director can be configured to accelerate the air flow through the turbine and facilitate the exhaust from the turbine of air which is not part of the prevailing air flow. The air flow director itself may operate like one-half of a venturi. This may be demonstrated by increased air flow velocity at the apex of the air flow director when compared to the velocity of the prevailing fluid flow prior to the prevailing fluid flow reaching the turbine. Specifically, as the fluid approaches the turbine, the velocity of the fluid may increase as it is forced to climb up the convex surface of the air flow director on the windward side of the rotational axis and then climb down the convex potion of the air flow director located leeward of the rotational axis. Unlike prior art, the air flow director does not permanently deflect the air flow to a new direction. Rather, the air flow director accelerates the air flow toward the turbine blades on a path that becomes parallel its original direction when the air flow reaches the blades and then returns the air flow to the original direction of the air flow before it encountered the turbine. Optional channeling members attached to or integrally formed in the convex surface of the air flow director may further help accelerate and direct the air flow passing through the turbine. In addition, the concave side of the air flow director may be shaped and relieved with openings not directly facing the air flow in order to expel from the area enclosed by the concave side of the air flow director air which is not part of the prevailing air flow. Solar cells can be mounted on the external surface of the air flow director for the purpose of generating electricity and the air flow director can be aligned with the sun to optimize the performance of the solar cells when the wind velocity is too low to operate the turbine.

Unlike prior art, the present system in HAWT and VAWT applications includes the air flow director that rotates with the turbine to advantageously orient or position the turbine blades to face the air flow, or angles or feathers the turbine in relationship to the air flow in order to reduce or eliminate rotational speeds in high velocity air flow.

Unlike prior art relating to both HAWT and VAWT designs, the air flow director minimizes stability issues by supporting the shaft firmly on both ends, thereby helping equalize bearing loads on both ends of the shaft and permitting large scale applications and the ability to be used in high velocity air flow.

The air flow director also reduces the rotational arc that the blades are exposed to the prevailing air flow which, combined with the low frontal area of the design facing the air flow and the small rotational diameter circumscribed by the blades relative to conventional three-bladed HAWT designs, reduces the propensity of the blades to strike birds.

In one embodiment, each blade is mounted to the respective mounting formation via a pin or hinge so that the blade can pivot on the mounting formation in order vary the angle of the blades relative to the mounting formations to increase the efficiency of the HAWT and VAWT by reducing drag on the blades when the blades are not exposed to the air flow. The blades are mounted via pins or hinges that allow the blades to pivot relative to their respective mounting formations. Preferably, the pin or hinge mounting arrangement allows pivoting movement of the blades in only one direction around the respective ends of the mounting formations and prevents the blades from pivoting in the opposite direction by stop members or tabs, or another functionally equivalent device of allowing the blades to pivot in only one direction relative to the mounting formations. It is contemplated that the blades will pivot only while the blades are not exposed to the prevailing air flow.

These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiments herein described are not intended to be exhaustive or to limit the invention to the precise forms disclosed. This specification is intended to describe the principles of the invention and the application and practical use of the invention to enable others skilled in the art to make and use the invention.

Figure 13:
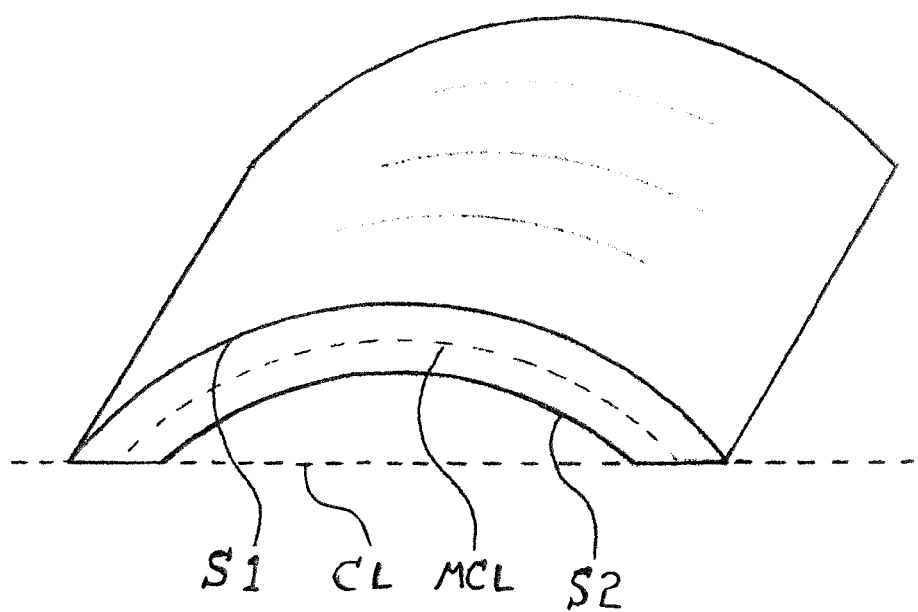
FIG. 13 is an oblique view of an embodiment blade, from the side.

Referring now to the drawings wherein like reference characters identify corresponding or similar elements throughout the several views, FIG. 1 depicts HAWT system 101 in accordance with a preferred embodiment of the present application. System 101 includes a plurality of blades 103, four blades being illustrated, although the number of blades may vary depending on the diameter of the turbine, the radial spacing of the blades around the shaft, and the distance the blades are suspended from the shaft by the mounting formations. In the preferred embodiment, the blades 103 are similarly constructed and in a preferred arrangement are approximately 1X wide by approximately 4X long, and approximately ¼X thick, although the relative dimensions of the blades may vary. The width "W" is measured in a line perpendicular to a leading edge (LE) of the blade, that portion of the blade located at a distal or radial outer edge of the blade away from the mounting formation, running from the LE to a trailing edge (TE) of the blade, that portion of the blade located at a proximal or radial inner edge of the blade where the blade is secured to the mounting formation. The length "L" is measured in a line parallel to the LE and the TE running from the point a blade is attached to a mounting formation which is attached to one end of the shaft to the point that blade is attached to a mounting formation which is attached to the opposite end of the shaft. The blade thickness "T" is measured in a line perpendicular to the chord of the blade running from the chord of the blade to the apex of the convex external surface of the blade. Each of the blades has positive camber when viewed in cross section, with a mean camber line closer than a chord line to a convex external surface of the blade. However, the blades may have different shapes, e.g., symmetrical, asymmetrical or twisted along the longitudinal axis of the blades. In the particular illustrated embodiment, the blades each have a first surface that is convex, and a second surface that is not convex with the non-convex surface of the blade shown as being planar, although one skilled in the art will appreciate that other conformations of the non-convex surface of the blade may be adopted, e.g., the non-convex surface may be concave and the blades can have a uniform or non-uniform width dimension "W" thickness along the length dimension "L" of the blade. FIG. 13 shows an example blade with a convex first (upper) surface S1, and with a second (lower) surface S2, which is shown as concave. A mean camber line MCL is closer than the first surface S1 to a chord line CL. Likewise, in the particular illustrated embodiment shown in FIG. 1 the cross section of the blade is shown to have a symmetric thickness in a width direction about a midpoint, being thickest at a midpoint between the leading and trailing edge and thinner at the leading edge and the trailing edge than they are between the leading edge and the trailing edge so that the air flow can provide positive Lift to the blades on the windward side of the rotational axis and also provide negative Lift to the blades on the leeward side of the rotational axis when the leading and trailing edges of the blades with respect to the air flow are reversed. However, if the cross-section of the blade is non-symmetrical, the turbine may work more efficiently by optimizing the blade shape for maximum positive Lift on the windward side of the rotational axis while sacrificing some negative Lift performance when the leading and trailing edges of the blades are reversed relative to the air flow on the leeward side of the rotational axis where the blades may encounter more air flow turbulence as a result of the air flow being disrupted as a result of having first encountered the blades on the windward side of the rotational axis. In the illustrated embodiment, the blades 103 are radially arrayed around the rotational axis with a width (chord) axis "W" of the blades 103 (where "W" is that chord line perpendicular to a LE and a TE of a blade) positioned parallel to the length axis of mounting formations 107 (measured on a line perpendicular to the shaft running from the point at which the mounting formations attach to the shaft to the point at which the mounting formations attached to the blades). The blades 103 are shown radially spaced around a shaft 105 that is desirably supported at least on opposite ends by suitable bearings to allow rotation of the shaft around a rotational axis. The spacing of the blades from one another and the distance they are suspended from the shaft is preferably designed to (i) minimize noise and/or vibration created during rotation of the blades and (ii) maximize the production of electrical or mechanical energy. The number of blades provided may be selected in accordance with the diameter of the turbine, the distance that the blades are spaced apart from the rotational axis defined by the shaft, and the radial spacing on the mounting formations 107 around the shaft 105. Further, the shaft 105 may not be longitudinally continuous through the center of the rotational axis but may consist of stub axles extending from the center of the mounting formations outward at the ends of the axis of rotation. The blades 103 are mounted to the shaft 105 by mounting formations 107 which are shown to position the blades 103 from the shaft 105 by a distance of approximately 2X, although the relative distance of such location of the blades 103 from the rotational axis or shaft 105 may vary and the distance of each blade from the shaft may also vary between individual blades. The mounting of the blades in a spaced relation to the shaft by the mounting formations 107 creates a clear passageway, gap, or opening (collectively "passageway") for the air flow 115 to pass through between the blades 103 and the shaft 105 which allows the air flow to impart a unidirectional rotational force on the shaft 105 when the blades 103 are located both windward and leeward of the shaft 105. The shaft 105 is supported by a frame that may include one or more frame members 109, i.e. the frame members support the bearings that rotationally support the shaft. An air flow director 111 is positioned adjacent to the blades 103 and the air flow director 111 is configured to accelerate the air flow as the air flow approaches the blades. The air flow director 111 is shown to include or form optional channeling members or walls 113 integrally formed as a part of the air flow director or separately attached to an outer surface thereof. The air flow director and the channeling members are shown as configured to accelerate and/or direct the air flow 115 along a desired path through the blades. Solar cells 122 are shown attached to the outer surface of the air flow director for the purpose of generating electricity.

The air flow director 111 encloses and shields the blades 103 from direct impact by the prevailing air flow along a portion of the rotational path of the blades. For example, the air flow director 111 is shown to shield the blades from the prevailing air flow 115 during that portion of the rotational path when the blades are not moving in the direction of the air flow 115, noting that the blades move directly opposite the air flow at the bottom of the arcuate path, and at other times that the blades are situated inside the air flow director the blades are moving partially opposite to the air flow. This configuration of the air flow director 111 enables the air flow 115 to efficiently rotate 117 the shaft 105. Without the air flow director 111, the rotational force imparted to the shaft 105 would be reduced or non-existent since the air flow impacting the blades 103 along that portion or segment of the rotational path when they are moving in the direction of the air flow would be counteracted by the air flow impacting the blades along that portion or segment of the rotational path when the blades are moving in the opposite direction of the air flow 115. By shielding the blades from the air flow for a portion of their rotational path when they are moving against the prevailing air flow, the turbine system is more efficient that prior VAWTs which merely present a low drag surface to the prevailing air flow when the blades move against the prevailing air flow.

FIG. 1 shows that the air flow director 111 is contoured to accelerate the air flow and may include side exhaust passages 119a and 119b and/or may include rear surface exhaust passages 121a and 121b preferably located on a leeward surface portion of the air flow director that facilitate the air that is not part of the air flow 115 exiting the space enclosed by the air flow director 111 which reduces drag on the blades when they are not exposed to the prevailing air flow.

Figure 2A:
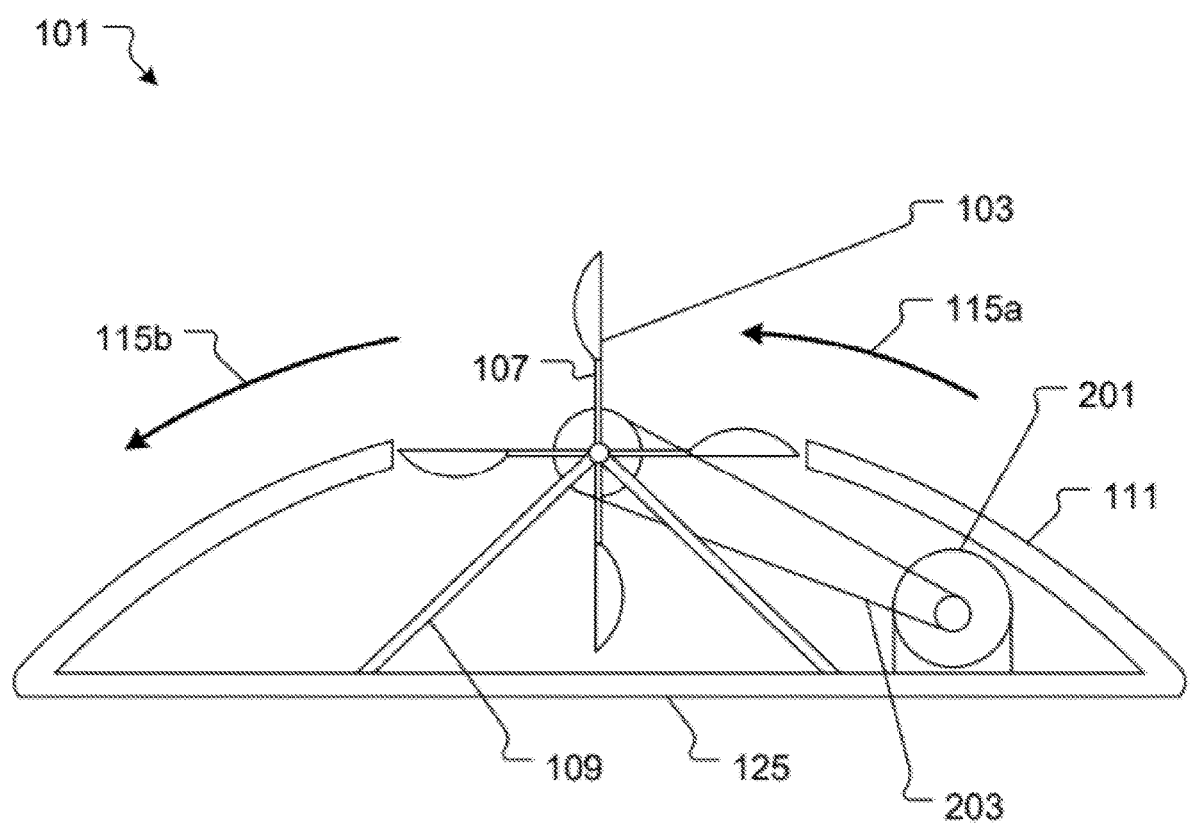
FIG. 2A is a cross-sectional view of the system of FIG. 1.

A generator 123, or any other load, is in rotational communication with the shaft 105 via a direct drive (extension of the shaft 105), gear box, or via a drive member such as drive belt (as shown in FIG. 2A) and is configured in the contemplated embodiment to create electricity therefrom. That is, the rotation of the shaft is transmitted to rotate the generator in a manner well known in the art so that further description of the generator and operation thereof is not provided herein nor necessary to a full and complete understanding of the present invention. System 101 is shown to incorporate a platform 125 that can rotate or the system could be attached or anchored at a desired location.

It should be appreciated that the unique features believed characteristic of the present application include blades that have positive camber when viewed in cross section, with a mean camber line closer than a chord line to a convex external surface of the blade. Unlike prior art, the present application discloses an orientation of the blades 103 around a rotating shaft 105 with the width (chord) axis of the blades "W" positioned parallel to the length axis of the mounting formations 107 (i.e., the axis of the radial direction of the mounting formations extending from the shaft). The present invention is unique in that it spaces the blades 103 away from the shaft 105 allowing the air flow 115 to pass through the turbine 101 (and particularly to pass over the air flow director 111) and create positive lift on blades located windward of the axis of rotation, impart a pushing force on the blades 103 as the blades transition from the windward to the leeward side of the rotational axis, and impart negative lift to the blades on the leeward side of the rotational axis 105 so that a unidirectional force is applied to the shaft by the blades 103 the entire time that the blades 103 are exposed to the air flow 115. Yet another unique feature is the inclusion of an air flow director 111 which may include or be equipped with optional channeling members 113 to accelerate and/or direct the air flow 115 through the turbine 101 and also limit or prohibit the air flow 115 from acting on the blades 103 when the blades 103 are moving in a direction which opposes the air flow 115. Further, the air flow director 111 may be configured to provide paths or openings 119 and 121 that facilitate exhausting fluid from the turbine which is not part of the prevailing air flow which reduces drag on the blades 103 when they are not exposed to the air flow. One or more of these features, individually and/or in various combinations make the system more efficient than prior art when subjected to the air flow 115.

Referring now to FIG. 2A, the system 101 is depicted wherein the frame members 109 supporting the shaft 105 are attached to the platform 125 and the generator 201 is attached to the platform 125. The generator 201 is in rotational communication with the shaft 105 via, for example, a flexible drive belt or chain 203 or other power transmission arrangement. While the generator 201 has been depicted as attached to the shaft directly as in FIG. 1 or by a belt or chain as in FIG. 2A, any method of placing the generator in rotational communication with the turbine is contemplated including but not limited to gears or a set of gears.

Figure 2B:
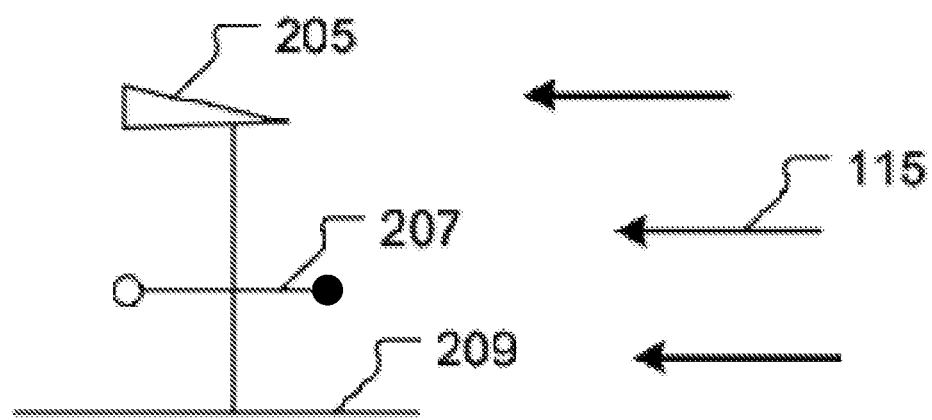
FIG. 2B is a schematic representation of the wind flow speed and direction sensors directed toward the wind flow.

Now referring to FIG. 2B, aligning the turbine to the direction of the air flow 115 is achieved by a fluid flow direction sensor 205 and also preferably a speed sensor 207 in communication with the system 101. The fluid flow direction sensor 205 and speed sensor 207 are exposed to the air flow 115 and are attached to a fixed surface above the ground 209 or water. The sensors, 205 and 207, send signals to direct the turbine to rotate in order to position or align the blades in the most desired orientation with the air flow 115. In high air flow velocities, the turbine may be aligned at an angle to the air flow 115 to reduce rotational speeds or aligned so as to feather the blades 90 degrees from the air flow 115 to prevent rotation of the shaft 105 altogether.

An alternative embodiment of system 101 is depicted by FIG. 3. Embodiment 301 is a top overhead view of system 101 showing the rotation 305 of the platform 125 via a rotational track device 303, although any method of rotating system 101 to align the system/blades with the air flow 115 is contemplated.

Figure 4:
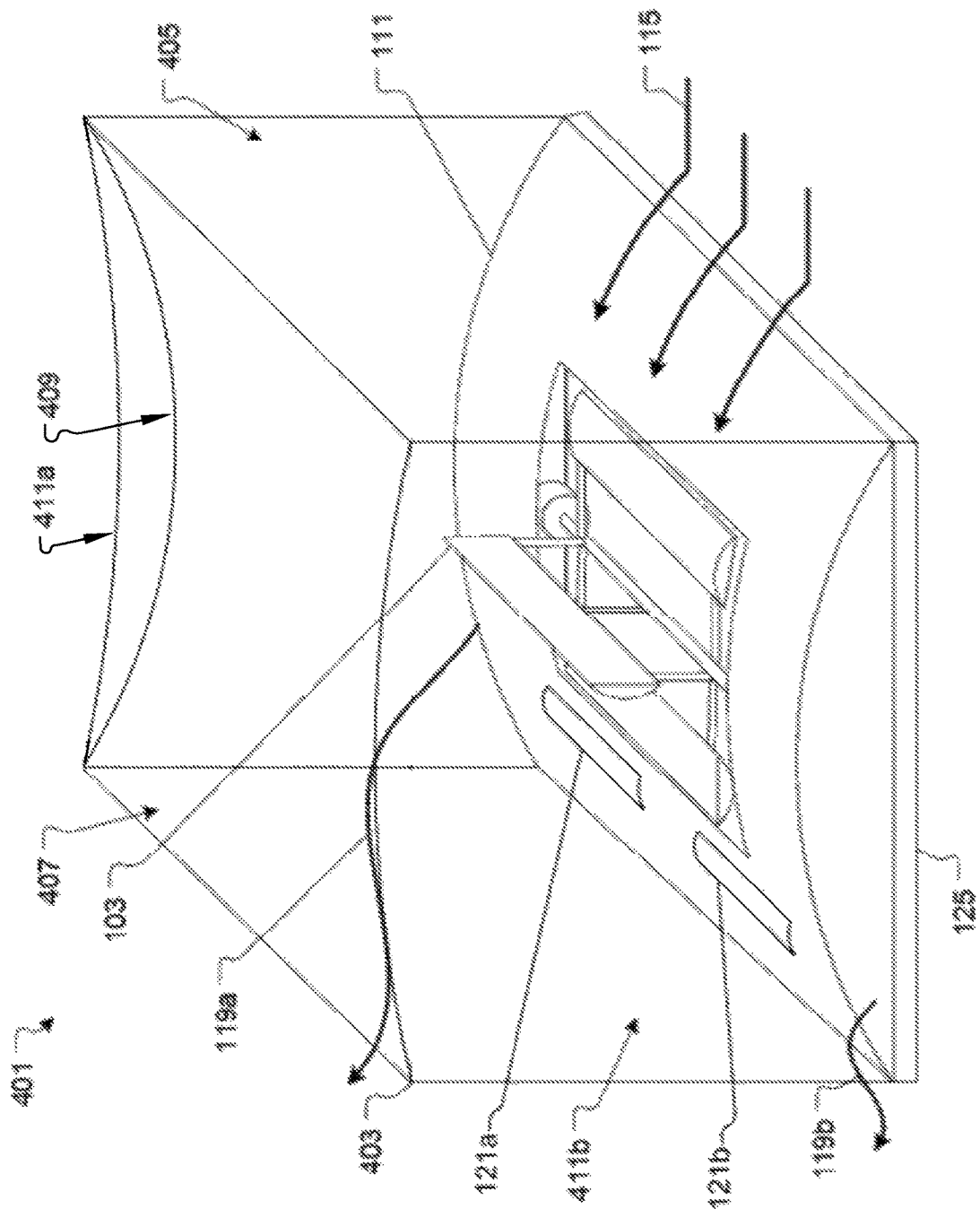
FIG. 4 is a perspective view of an alternative embodiment of a HAWT system.

An alternative embodiment of system 101 is depicted by FIG. 4. Embodiment 401 includes similar features as system 101 with the addition of a superstructure 403 which is open on the front 405 and back 407 but closed on the top 409 and sides 411. The superstructure 403 extends upwardly from the top of the air flow director 111 and leaves open side exhaust passages 119 and/or surface exhaust passages 121. The sides 411 and top 409 are desirably curved and positioned so that convex surfaces thereof face the interior of the turbine to accelerate and direct the air flow 115 through the turbine.

Figure 5:
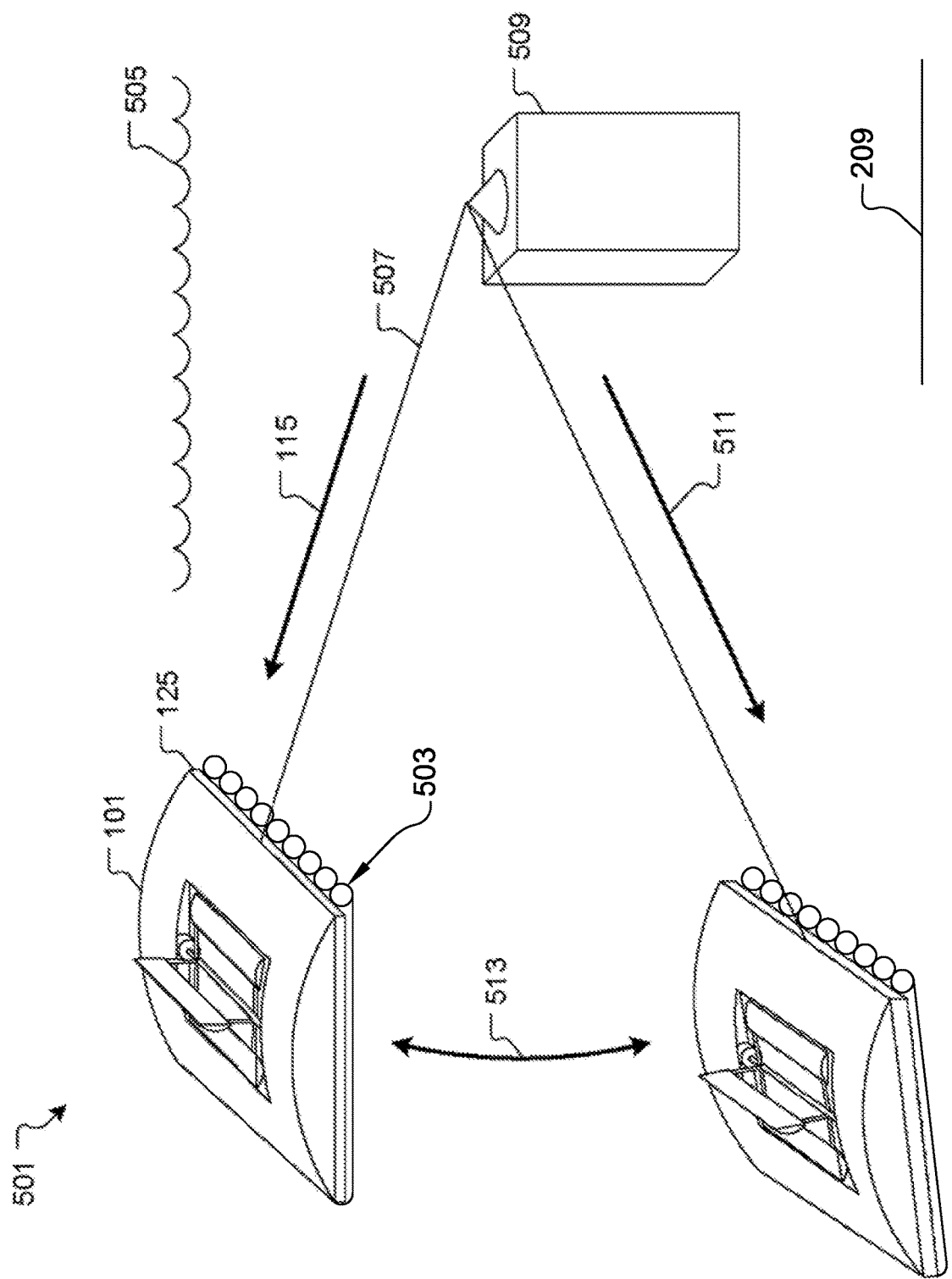
FIG. 5 is a perspective view of another alternative embodiment of a HAWT system.

Yet another alternative embodiment of system 101 is depicted by FIG. 5. Embodiment 501 includes similar features to system 101 wherein the platform 125 is mounted on or replaced by a float or rollers/wheels 503 so as to allow the system 101 to remain on the top of a body of water 505 or to roll on land 209. The platform 125 shown in FIG. 5 is thus a buoyant platform. It is contemplated and will be appreciated that the platform 125 may be attached to a fixed pivot point 509 via a tether 507 so that the system 101 is able to pivot about point 509. The pivoting attachment aligns the platform relative to the air flow 115 by floating or rolling the system into position downwind of the fixed pivot point 509 facing the new direction of air flow 511 after moving distance 513.

Figure 6:
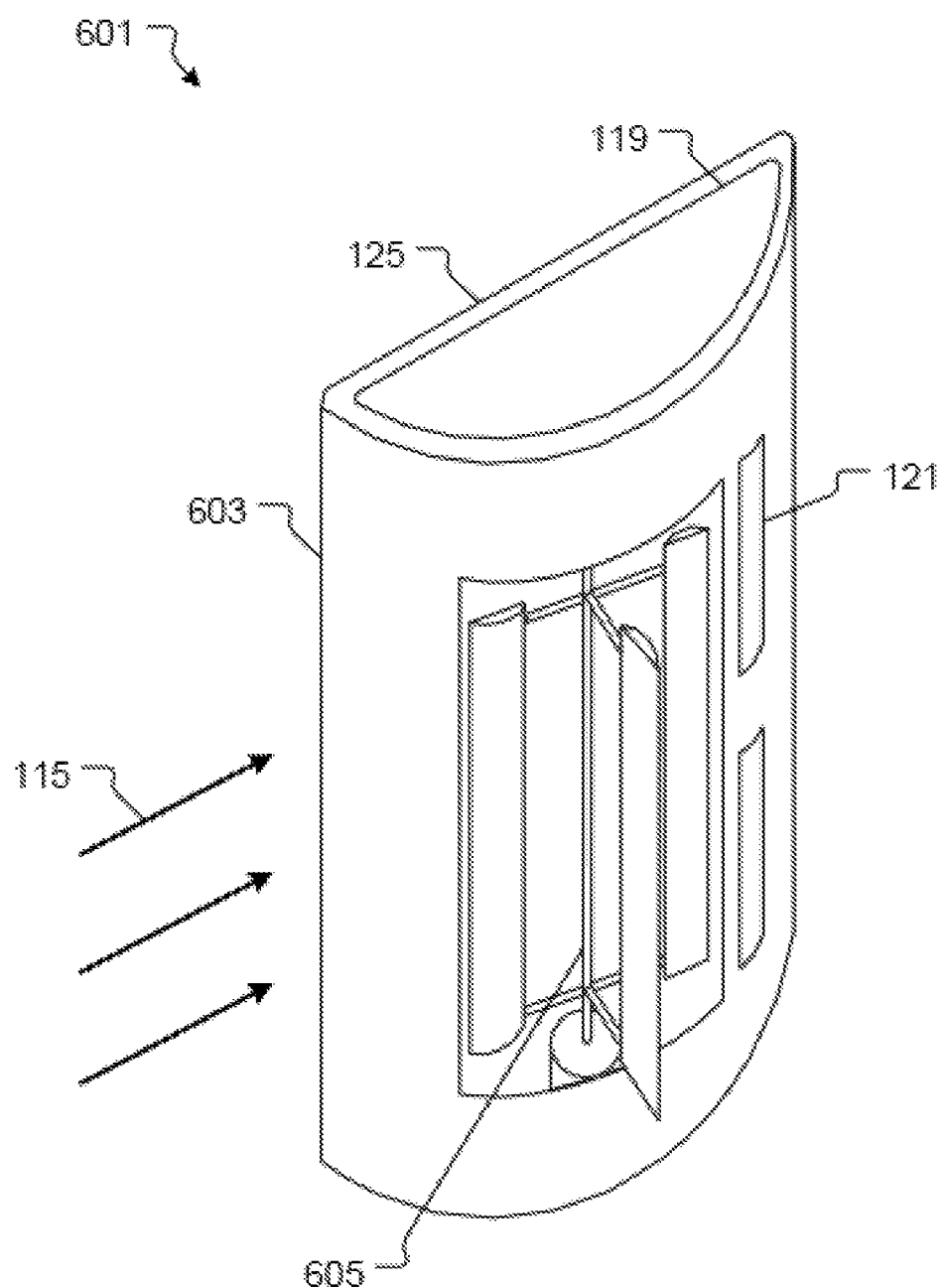
FIG. 6 is a perspective view of an exemplary embodiment of a VAWT system having multiple blades.

Referring now to FIG. 6, a VAWT embodiment of the system 101 is depicted. In this embodiment 601 the air flow director 603 is oriented so that the shaft 605 is vertical with respect to ground. The embodiment 601 includes similar features to system 101 and like numbers are used for like features. It will be appreciated that the vertical orientation enables the VAWT.

Figure 7A:
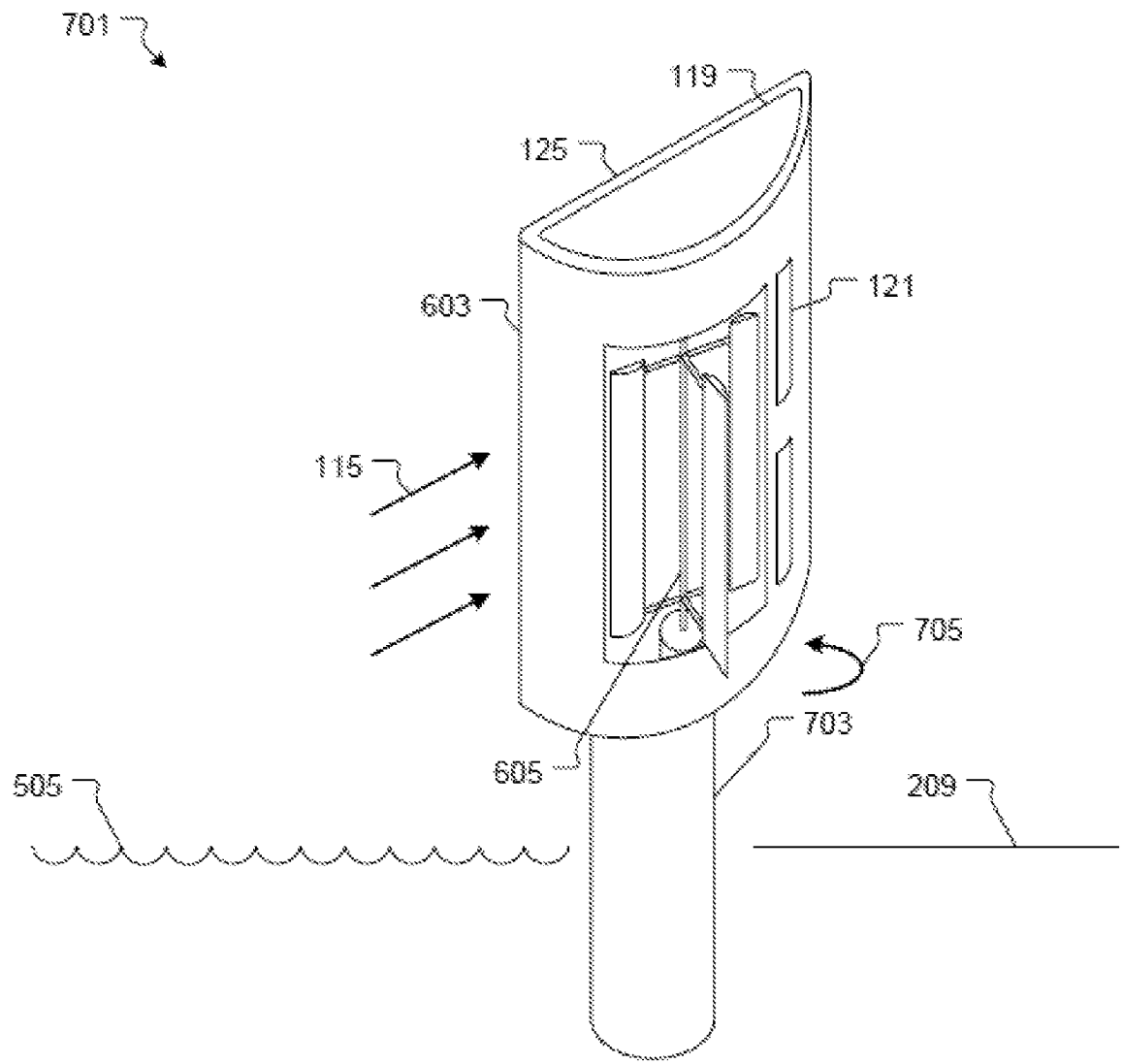
FIG. 7A is a perspective view of an alternative embodiment of a VAWT system.

It is contemplated and will be appreciated that the VAWT system 601 could be elevated to further increase the efficiency thereof. FIG. 7A depicts such an embodiment 701. The air flow director 603 is attached to a pedestal 703 that is anchored to ground 209 or below water 505. The pedestal 703 is configured to rotate 705 or allow the air flow director 603 to rotate to orient the turbine with the air flow 115 as directed by signals from the fluid flow direction sensor 205 and speed sensor 207 (FIG. 7B).

Figure 7B:
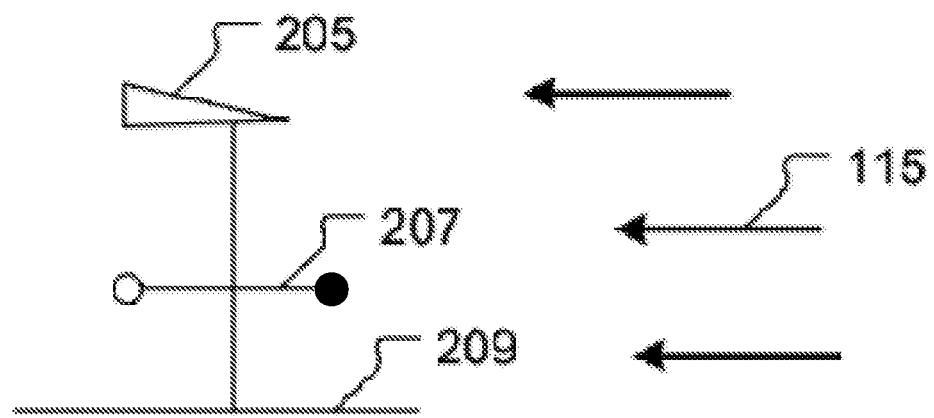
FIG. 7B is a schematic representation of the wind flow speed and direction sensors directed toward the wind flow.
Figure 8:
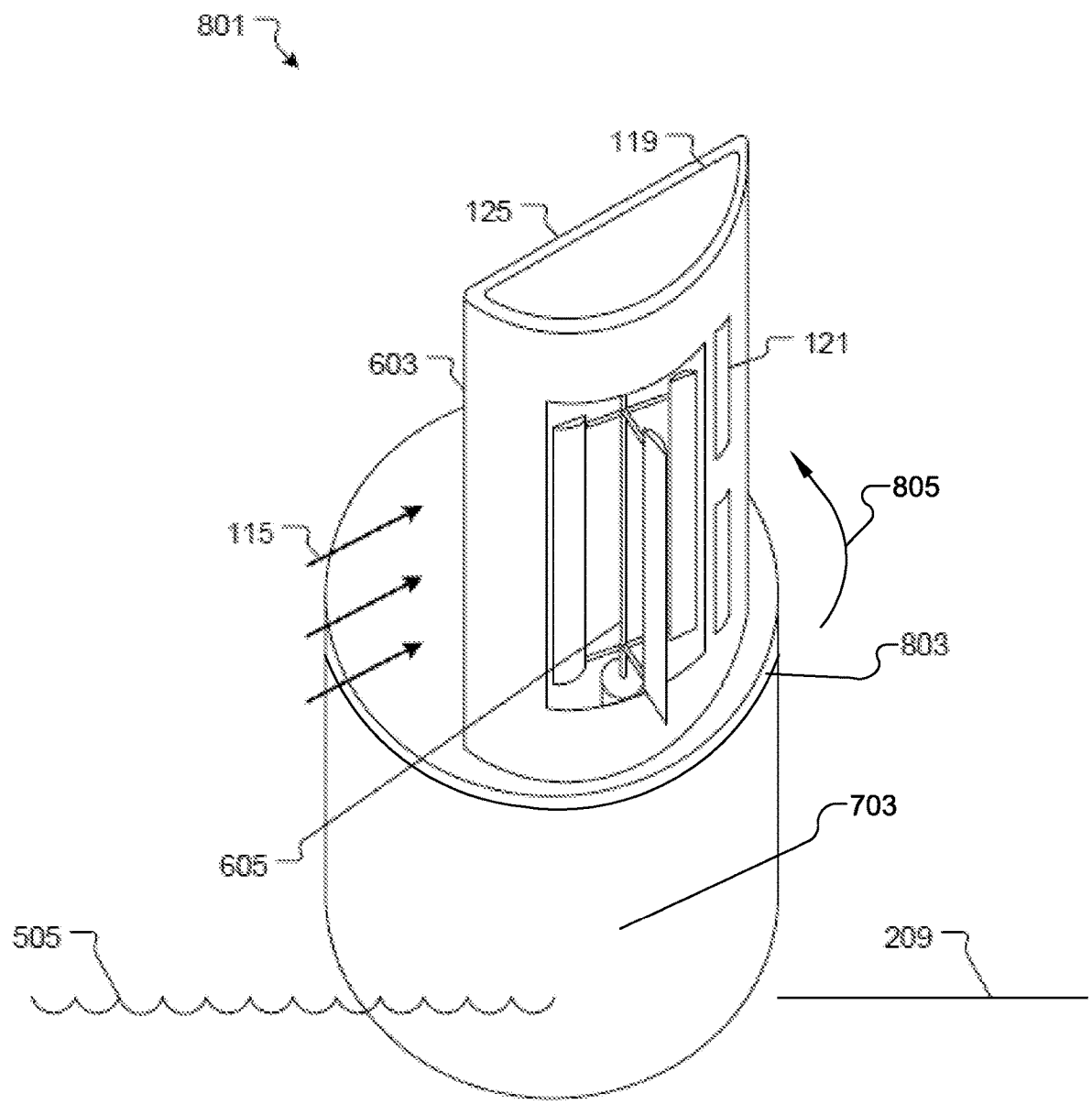
FIG. 8 is a perspective view of another alternative embodiment of a VAWT system.

Referring now to FIG. 8, an alternative VAWT embodiment of the system 601 is depicted. Embodiment 801 includes like features as system 701 wherein the air flow director 603 is placed on a rotation device or turntable 803, which rotates as represented by reference arrow 805 to align the turbine with the air flow 115. Signals from the fluid flow direction sensor 205 and speed sensor 207 (FIG. 7B) may be conveyed to an actuator, for example, that moves the turntable in the desired direction. It is contemplated that the embodiment 801 could be on ground 209 or over a body of water 505 and the turntable 803 could be mounted on a pedestal 703.

Figure 9:
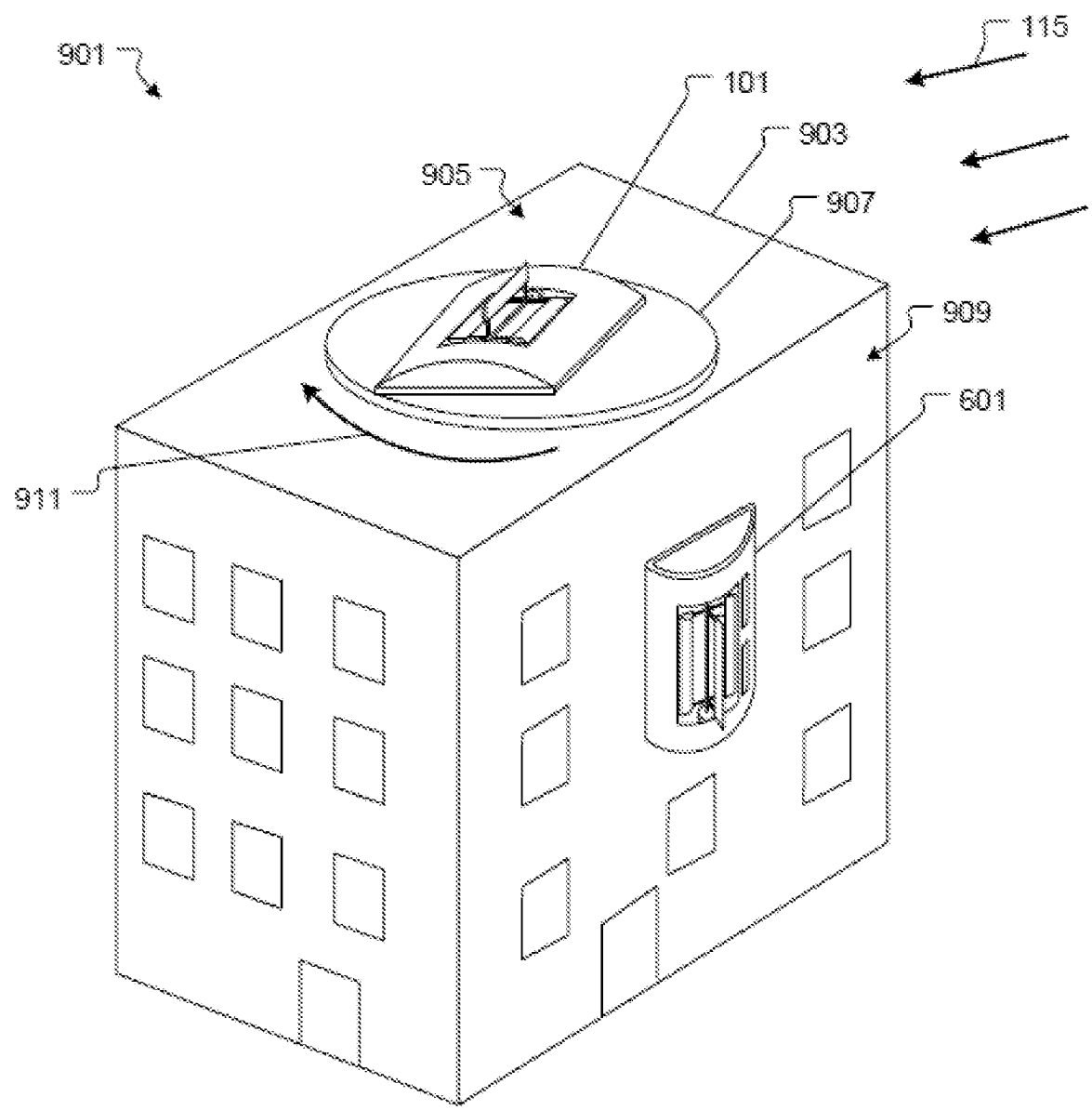
FIG. 9 is a perspective view of another alternative embodiment of a VAWT system.

FIG. 9 shows embodiment 901 which contemplates that the system 101 HAWT could be mounted on a turntable 907 attached to the roof 905 of a building 903 so that the system 101 HAWT rotates 911 to align with the air flow 115 as directed by signal from the fluid flow direction sensor 205 and speed sensor 207 (FIG. 7B). It is also contemplated that system 601 VAWT could be attached to the side 909 of a building 903.

Figure 10:
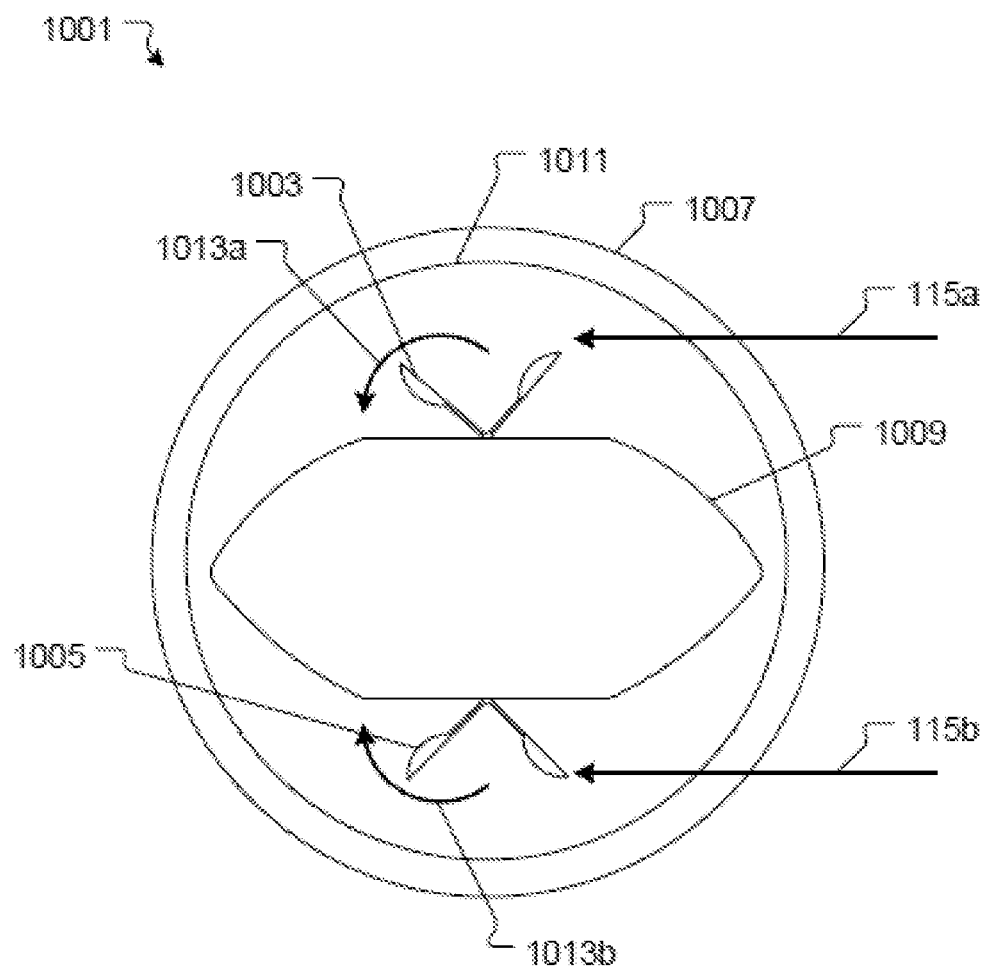
FIG. 10 is top view of another alternative embodiment of a VAWT system.

Referring now to FIG. 10 an alternative embodiment of system 601 is depicted. Embodiment 1001 includes a first VAWT system 1003 and a second VAWT system 1005 attached to the back side thereof. Both the first system 1003 VAWT and the second system 1005 VAWT are held within a common air flow director 1009 that is attached to a platform 1011 that is attached to a turntable 1007. This arrangement allows VAWT system 1001 to be oriented relative to the air flow 115 as directed by signals, for example, from the air flow direction sensor 205 and speed sensor 207 (FIG. 7B). It will be appreciated that the system 1001 when oriented to the air flow 115 enables both sets of blades 1013*a* and 1013*b* to rotate (counterrotate) about their respective shafts 105 in opposite directions.

Figure 11:
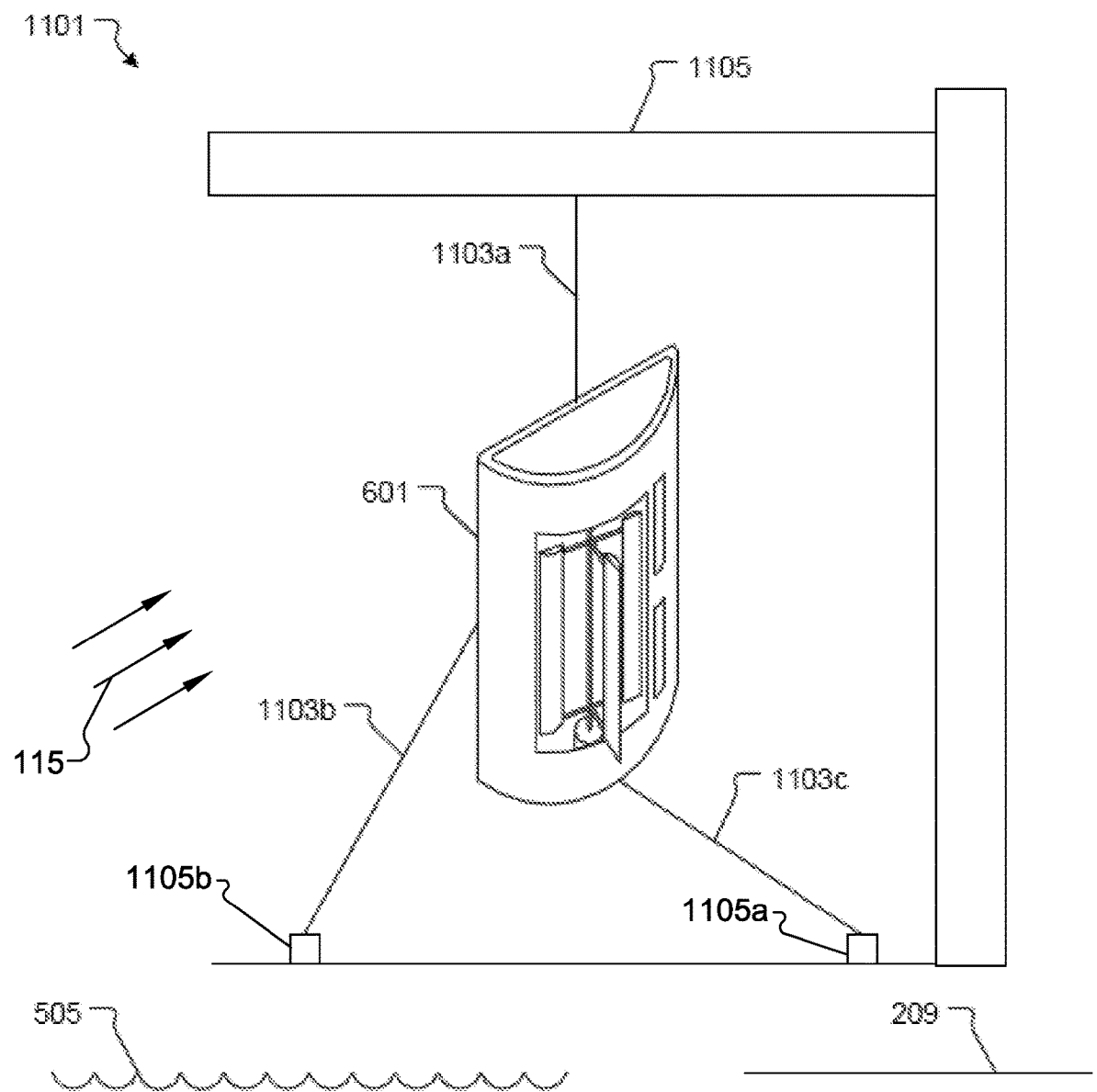
FIG. 11 is a perspective view of yet another alternative embodiment of a VAWT system.

It is further contemplated and depicted in FIG. 11 that a HAWT system 101 or VAWT system 601 is suspended above ground 209 or water 505 via cables 1103 (1103*a*, 1103*b*, and 1103*c*) and fixed mounts 1105. The cables 1103*a*-1103*c* are examples of tethers that may be used to suspend the system 601. It will be appreciated that the cables 1103 and fixed mounts 1105 are configured to allow the system 101 HAWT or 601 VAWT to align with the direction of the air flow 115.

Figure 12:
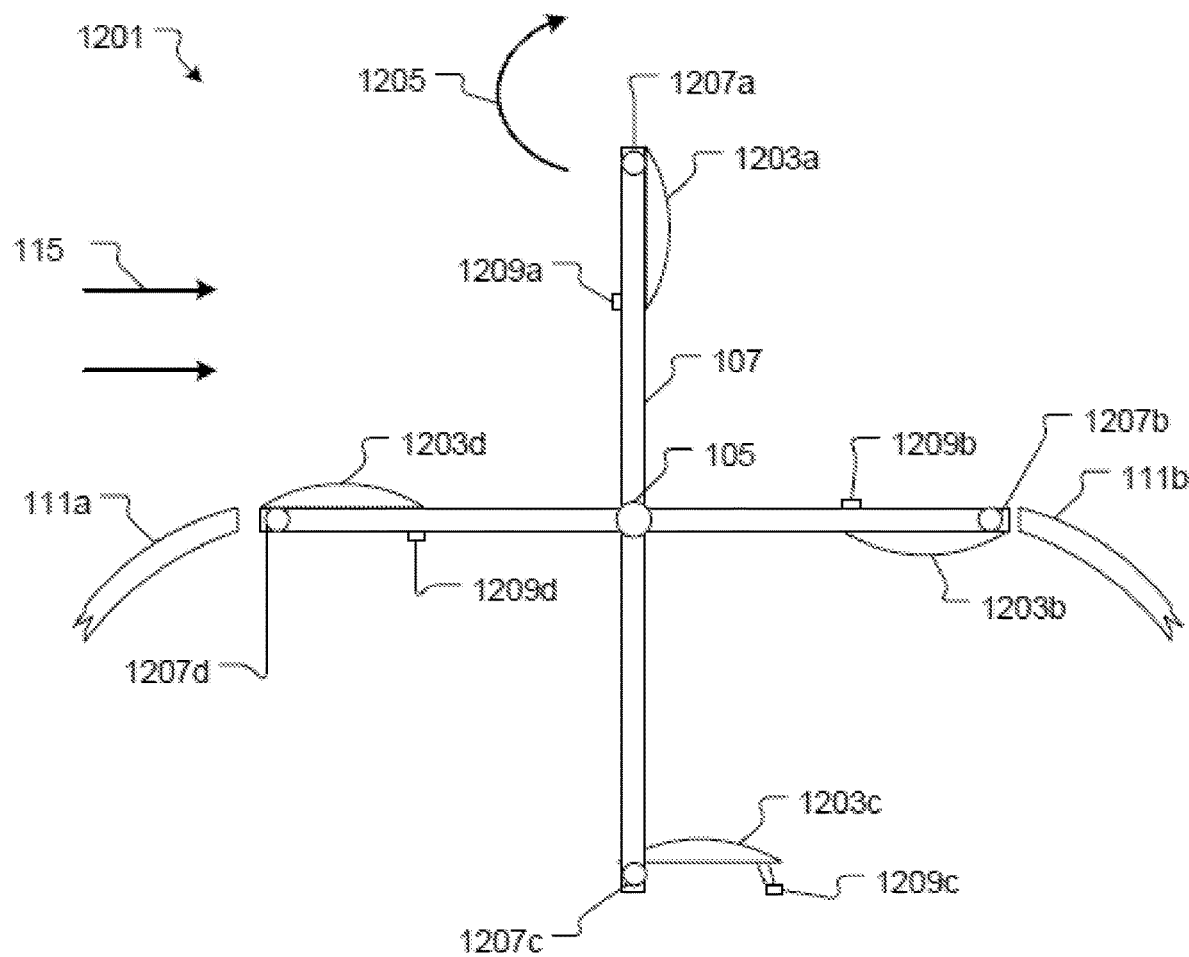
FIG. 12 is a side view of an alternative embodiment for use in HAWT and VAWT systems.

It is further contemplated in embodiment 1201 and depicted in FIG. 12 that in a HAWT system 101 or in a VAWT system 601 the angle of attack of the blades relative to the mounting formations may be variable in order to increase the efficiency of the turbine by reducing drag when the blades are not exposed to the air flow. The blades 1203 are mounted via pins that allow the blades to pivot 1205 relative to the respective mounting formation. Preferably, the pin mounting arrangement allows pivoting movement of the blades 1203 in only one direction around the respective ends 1207 of the mounting formations 107 and are prevented from pivoting in the opposite direction by stop member or tabs 1209, or another functionally equivalent device of allowing the blades 1203 to pivot 1205 in only one direction relative to the mounting formations 107. It is contemplated that the blades 1203 will pivot only while the blades are not exposed to the air flow 115.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A turbine system comprising:
   a shaft configured to rotate about a rotational axis;
   a plurality of blades coupled to the shaft, wherein the blades are oriented with the width (chord) axis of the blades aligned in a radial direction away from the rotational axis, and wherein the blades are configured to provide lift according to the Bernoulli principle resulting from lower pressure on convex first blade sides of the blades exposed to air flow than on second blade sides of the blades exposed to the air flow, when fluid passes on both sides of the blades, the lift provided in the direction of rotation through portions of the rotation of the blades about the rotational axis on both the windward and leeward sides of the rotational axis;
   mounting formations which attach the blades to the shaft and suspend the blades away from the shaft, with air flow passages defined between the shaft and the blades; and
   an air flow director configured to expose the blades to air flow through a first part of rotation of the blades about the rotational axis, and to block air flow to the blades through a second part of the rotation of the blades about the rotational axis;
   wherein the air flow director is configured and oriented to direct the air flow in part through the air flow passages defined between the shaft and the blades; and
   wherein the air flow director has a convex outer surface located on the leeward side of the blades, with the convex outer surface exposed to the air flow; and
   wherein the air flow director with the convex outer surface exposed to the air flow on the leeward side of the rotational axis is configured so that when the blades are moving on the leeward side of the rotational axis, a straight line perpendicular to the chord line of any blade drawn from the chord line away from the convex surface of such blades will not intersect the convex surface of the air flow director on the leeward side of the rotational axis.

2. The turbine system of claim 1, wherein the air flow director further has exhaust passages in the portion of the air flow director which is located leeward of the blades.

3. The turbine system of claim 1, wherein the air flow director defines side passages that allow air flow to exhaust from the area encompassed by an inner surface of the air flow director which is not exposed to the air flow.

4. The turbine system of claim 1, wherein the air flow director has a portion located on the windward side of the blades, the portion on the windward side having a convex outer surface exposed to the air flow on a windward side of the blades, which is configured to accelerate the air flow through the turbine.

5. The turbine system of claim 4, wherein the air flow director has curved channeling flow diverters aligned with convex surfaces facing the vertical centerline of the air flow diverter mounted on an external surface of the air flow director, for diverting air flow toward the blades.

6. The turbine system of claim 1, wherein the blades are symmetrical in cross section.

7. The turbine system of claim 1, wherein the air flow director has a portion located on the windward side of the blades.

8. The turbine system of claim 7, wherein the air flow director further has exhaust passages in the portion of the air flow director which is located leeward of the blades.

9. The turbine system of claim 1, wherein the air flow director defines side passages that allow air flow to exhaust from the area encompassed by an inner surface of the air flow director which is not exposed to the air flow.

10. The turbine system of claim 1,
    wherein the blades each have a leading edge, proximal to the rotational axis, and a trailing edge, distal to the rotational axis; and
    wherein for each of the blades a chord line of the blade from the leading edge to the trailing edge intersects with the rotational axis.

11. The turbine system of claim 1, wherein the blades each are configured to provide positive Bernoulli principle lift on a windward side of the shaft, tending to pull the blades into the air flow, and negative Bernoulli principle lift on a leeward side of the shaft, tending to push the blades out of the air flow.

12. The turbine system of claim 1, further comprising a generator that converts rotational energy to electrical or mechanical energy, wherein the generator is operatively connected with the shaft.

13. The turbine system of claim 1, further comprising a platform configured for rotation on an axis such that the blades exposed to the air flow are aligned with the direction of the air flow.

14. The turbine system of claim 13, wherein the platform is buoyant.

15. The turbine system of claim 1, further comprising a buoyant platform connected by a tether to a fixed mount allowing the platform to float downwind of the air flow.

16. The turbine system of claim 1, wherein the turbine system is in combination with tethers used to mount the turbine system to a supporting structure.

17. The turbine system of claim 1 wherein the turbine is mounted on the top and/or side of a building.

18. The turbine system of claim 1, wherein the turbine is positioned with a vertical rotational axis and is mounted on a turntable or is otherwise enabled to rotate on a pedestal.

19. The turbine system of claim 1, wherein the air flow director has a convex outer surface exposed to the air flow, and an opposite, flat surface mounted on the earth or afloat that is not exposed to the air flow.

20. The turbine system of claim 1, an air flow director configured to form a single continuous airfoil windward of the blades, and leeward of the blades.

21. The turbine system of claim 1, wherein the second blade sides are non-convex.

22. The turbine system of claim 21, wherein the second blade sides are concave.

23. The turbine system of claim 21, wherein the second blade sides are flat.

24. The turbine system of claim 1, wherein the blades each have a symmetric thickness in the width direction about a midpoint along the chord line, being thickest at the midpoint along the chord line between a leading edge and a trailing edge, and thinner at the leading edge and the trailing edge than they are between the leading edge and the trailing edge.

25. The turbine system of claim 1, wherein the air flow director is configured to accelerate the air flow as the air flow flows over a windward part of the air flow director and to direct the accelerated air flow through air flow passages defined between the shaft and the blades, and then the air flow director returns the air flow to an original direction of the air flow as the air flow travels over a leeward part of the air flow director.

* * * * *